United States Patent
Dhall

(10) Patent No.: US 8,204,902 B1
(45) Date of Patent: Jun. 19, 2012

(54) DYNAMIC RANKING OF EXPERTS IN A KNOWLEDGE MANAGEMENT SYSTEM

(75) Inventor: Sanjay Dhall, Canton, MI (US)

(73) Assignee: Emergent Systems Corporation, Dearborn, MI (US)

( * ) Notice: Subject to any disclaimer, the term of this patent is extended or adjusted under 35 U.S.C. 154(b) by 260 days.

(21) Appl. No.: 12/712,334

(22) Filed: Feb. 25, 2010

Related U.S. Application Data

(60) Provisional application No. 61/155,974, filed on Feb. 27, 2009.

(51) Int. Cl.
*G06F 17/30* (2006.01)
(52) U.S. Cl. .................................. 707/769; 707/723
(58) Field of Classification Search .................. 707/723, 707/769
See application file for complete search history.

(56) References Cited

U.S. PATENT DOCUMENTS

| | | | |
|---|---|---|---|
| 5,355,445 A | 10/1994 | Shibao et al. | |
| 5,809,493 A | 9/1998 | Ahamed et al. | |
| 6,353,767 B1 | 3/2002 | Wakeman et al. | |
| 7,158,923 B1 | 1/2007 | Murthy et al. | |
| 2002/0052808 A1* | 5/2002 | Sekihata et al. | 705/28 |
| 2005/0071135 A1 | 3/2005 | Vredenburgh et al. | |
| 2005/0091191 A1 | 4/2005 | Miller et al. | |
| 2006/0025983 A1 | 2/2006 | Arbitter et al. | |
| 2006/0206462 A1* | 9/2006 | Barber | 707/3 |
| 2009/0077066 A1* | 3/2009 | White | 707/5 |

* cited by examiner

*Primary Examiner* — Cheryl Lewis
(74) *Attorney, Agent, or Firm* — Young Basile Hanlon & MacFarlane P.C.

(57) ABSTRACT

A method for ranking experts in a knowledge management system. A plurality of data elements are stored in a database, the data elements having substantive technical data and bibliographic information encoded therein. A result set is produced from the database in response to a user query, the result set including data elements having technical data encoded therein that corresponds to the query. An expert list is produced based on the bibliographic information for the data elements contained in the result set. Each expert in the expert list is ranked based on criteria associated with the result set to produce a ranked expert list.

20 Claims, 2 Drawing Sheets

DYNAMIC RANKING OF EXPERTS IN A KNOWLEDGE MANAGEMENT SYSTEM

CROSS-REFERENCE TO RELATED APPLICATIONS

This application claims the benefit of U.S. Provisional Patent Application No. 61/155,974, filed on Feb. 27, 2009.

FIELD OF THE INVENTION

The present invention relates to the field of knowledge management systems, and more particularly, to identifying experts associated with data elements in a knowledge management system.

BACKGROUND OF THE INVENTION

Although varied in scope and implementation, knowledge management systems generally intend to identify, codify, and distribute knowledge across an organization. In particular, knowledge management systems are typically computer implemented, database driven systems that store discrete elements of knowledge in a computer interpretable format so that the organization's knowledge can be refined and disseminated into various contexts as need arises. Typically, knowledge management systems utilize knowledge elements, such as parametric values, functions, rules, or other data, that control automation of calculations, comparisons, or other tasks. For example, a knowledge management system can be used to automate generation of product documentation, where the documentation is automatically updated when changes are made to the underlying data, such as design standards. Similarly, a knowledge management system can be used to automate or assist certain aspects of product design.

By way of example, the field of knowledge-based engineering (KBE) integrates knowledge management systems with computer-aided design (CAD) and computer-aided engineering (CAE) systems. For example, knowledge that is codified in the knowledge management system may be applied to a three-dimensional model of a product to dynamically apply or change parameters that are utilized to define or alter aspects of the three-dimensional product model in the CAD system.

While knowledge management systems have proven very useful for automating certain processes and distributing know-how across large organizations, the requirement for personal involvement of an expert remains critical in many situations. Previous methods for identifying experts having knowledge in a particular field involve pre-defined classification systems, where experts are identified in advance as relevant to one or more particular classifications. However, these systems are inflexible, and are ill-adapted to identification of an expert having a high level of expertise with regard to a very narrow, highly specialized subject area that represents a subset of one of the pre-defined classifications. Accordingly, need exists for improvement in the identification, by a knowledge management system, of experts relevant to a particular subject area.

SUMMARY OF THE INVENTION

The invention provides a knowledge management system that ranks experts associated with knowledge elements identified in response to a specific user query. According to one method taught herein, a plurality of data elements are stored in a database. The data elements have substantive technical data and bibliographic information encoded therein. A result set is produced from the database in response to a user query. The result set includes data elements having technical data encoded therein that corresponds to the query. An expert list is produced based on the bibliographic information for the data elements contained in the result set. Each expert in the expert list is ranked based on criteria associated with the result set to produce a ranked expert list.

The method may include the step of transmitting the ranked expert list to the user system.

The step of ranking each expert in the expert list may include computing an expert score for each expert based on the bibliographic information for the data elements contained in the result set.

The bibliographic data may include authorship information, wherein each expert score is computed based on component scores corresponding to each data element in the result set, and each component score is computed based at least in part on the authorship information for the data element. Furthermore, the bibliographic data may include modification information, wherein each expert score is computed based on component scores corresponding to each data element in the result set, and each component score is computed based at least in part on the modification information for the data element. Additionally, the bibliographic data may include usage information, wherein each expert score is computed based on component scores corresponding to each data element in the result set, and each component score is computed based at least in part on the usage information for the data element.

The bibliographic information for each data element may include at least one of identification of the expert that authored the data element, identification of each expert that modified the data element, or identification of each expert that used the data element.

The expert score for each expert may be computed based on at least one of a number of authorship events associated with the expert for the data elements contained in the result set, a number of modification events associated with the expert for the data elements contained in the result set, or a number of usage events associated with the expert for the data elements contained in the result set.

The method may further include the step of associating a quality score with each data element of the plurality of data elements, wherein each expert score is computed based on component scores corresponding to each data element in the result set, and each component score is weighted according to the quality score of the data element.

Each expert score may be computed based on component scores corresponding to each data element in the result set, wherein each component score is computed based on a subset of the bibliographic information that falls within a temporal window of significance.

BRIEF DESCRIPTION OF THE DRAWINGS

The description herein makes reference to the accompanying drawings wherein like referenced numerals refer to like parts throughout several views and wherein.

DETAILED DESCRIPTION OF THE PREFERRED EMBODIMENT

Figure 1:
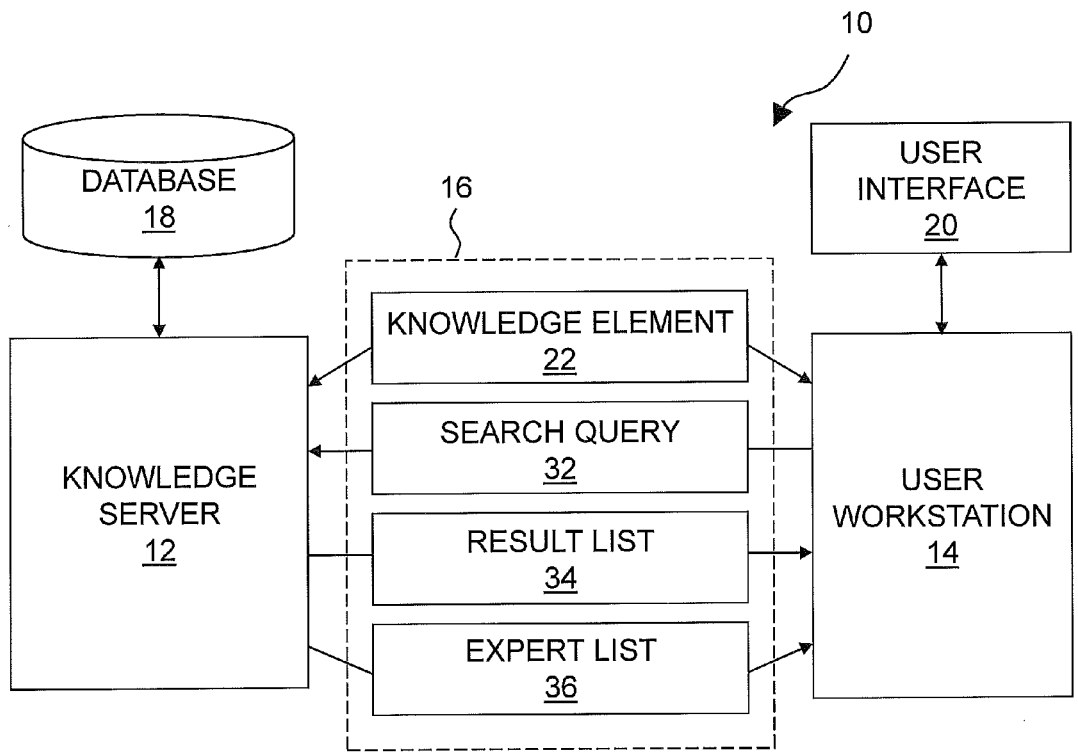
FIG. 1 is a block diagram showing a knowledge management system according to the present invention.

Referring to the drawings, the present invention will now be described in detail with reference to the disclosed embodiment.

As shown in FIG. 1, the invention provides a knowledge management system 10 that ranks experts associated with knowledge elements identified in response to a specific user query. The knowledge management system 10 can include a knowledge server 12 and a user workstation 14, each of which includes one or more computers that are configured according to the invention, for example, by provision of appropriate software to the knowledge server 12 and the user workstation 14. The knowledge server 12 and user workstation 14 are in communication with one another, for example, using a communications network 16, such as the internet, a local area network, or an analogous system for interconnecting remote computers for data transmission therebetween. To allow for storage and retrieval of data, the knowledge server 12 includes or is operatively connected to a database 18. To allow the user workstation 14 to receive information from a user and present information to a user, the user workstation 14 may include a user interface 20, which may include standard input/output devices such as a monitor and keyboard.

The knowledge server 12 provides a means for codifying the know-how of an expert into a computer interpretable form such as a knowledge element 22, which is also referred to herein as a data element. The knowledge server 12 receives the knowledge elements 22 from the user workstation 14 and stores the knowledge elements 22 in the database 18 for future use by the user workstation 14. When directed to do so by the user workstation 14, the knowledge server 12 retrieves one or more of the knowledge elements 22 from the database 18 and provides the knowledge elements 22 to the user workstation 14.

Each knowledge element 22 may include several different types of data, which may be stored in the knowledge element 22. In particular, the data contained in each knowledge element 22 is structured, so as to be computer interpretable. For example, the data contained in each knowledge element may comprise a parameter name/value pair. Each knowledge element 22 may be stored as fields in a database table in the database 18 or in a structured document format such as XML, or in any other suitable fashion. However, while the knowledge elements 22 are described as discrete units containing the various types of data described herein, such description is made for explanatory purposes only, and is not limiting of the invention. Rather, the various types of data associated with each knowledge element 22 could be stored separately, as long as they are identifiable by the knowledge server 12, the user workstation 14 or another associated system as related with one another as portions of the knowledge element 22.

Figure 2:
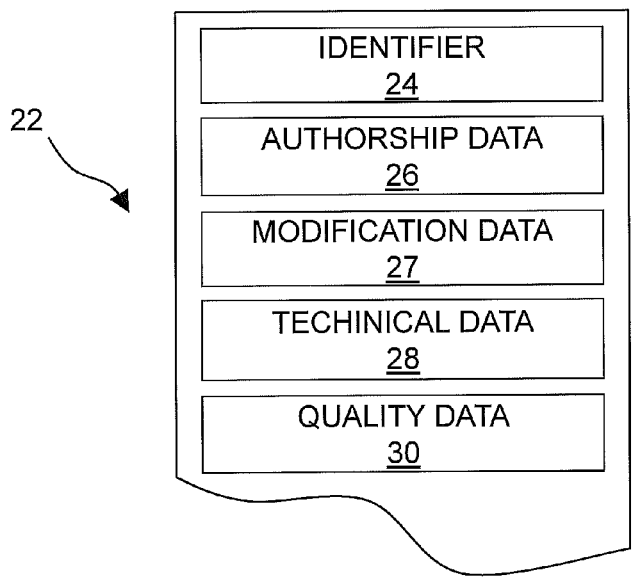
FIG. 2 is an illustration showing a knowledge element according to the present invention.

The particular data encoded within the knowledge element 22 may vary by application, but will generally include bibliographic information and substantive information. For example, each knowledge element 22 could include an identifier 24 that allows the knowledge element 22 to be identified by the knowledge server 12, the user workstation 14, and by other knowledge elements 22, as shown in FIG. 2.

In order to identify the person who authored each knowledge element 22, each knowledge element 22 includes authorship data 26. The authorship data 26 typically includes data identifying the author, such as a name, number or other identifying information, as well as the date on which the knowledge element 22 was authored.

In addition to the authorship data 26, each knowledge element may also include modification data 27, identifying any person or persons who have modified the knowledge element 22 (modifying users), as well as the date associated with each modification of the knowledge element 22.

The knowledge elements 22 also include, as the principal component thereof, technical data 28, which represents the know-how that is encoded within the knowledge element 22. The technical data 28 may include parametric relationships, attributes, and conditional relationships between values, mathematic expressions, or similar types of information. For example, the technical data 28 could be a rule or a set of rules that correlate input values to output values, where the input values and output values could be values, parameters, or expressions. Furthermore, the technical data 28 could describe a complex relationship between an input value and an output value that combines two or more of the previously mentioned classes of technical data 28. In this manner, a number of knowledge elements 22 may be programmatically interrelated, interpreted, and applied by the knowledge server 12 and the user workstation 14 for utilization in conjunction with automated problem solving or design applications.

In order to provide information to the user and the knowledge server 12 regarding the validity of the technical data 28 that is encoded in the knowledge element 22, each knowledge element 22 could include quality data 30, which may comprise data from which a score or ranking indicative of the quality of the technical data 28 may be computed by the knowledge server 12, or may comprise a previously stored quality score. For example, the quality data 30 could comprise a quality score computed according to the method described in pending patent application Ser. No. 12/262,456, which is incorporated herein in its entirety by reference.

The user workstation 14 is equipped with software that allows the user workstation 14 to communicate with the knowledge server 12 and consume the knowledge elements 22, wherein consumed means that the knowledge element 22 is interpreted by the user workstation 14 and applied in any desired manner. For example, the user workstation 14 could include document management software that dynamically generates documentation based on user defined criteria in combination with one or more knowledge elements 22. As another example, the user workstation 14 could include a knowledge based engineering software package that interfaces with a computer-aided design software package to automate design and drafting functions in light of the technical data 28 contained in one or more of the knowledge elements 22.

In order to allow a user to manually search and view the knowledge elements 22 that are stored in the database 18 of the knowledge server 12, the user workstation 14 is provided with a search module, which may be in the form of software resident on the user workstation 14 or in the form of a web based interface generated by the knowledge server 12 or an auxiliary system that is in communication with the knowledge server 12 and/or the database 18. The search module is presented to the user by way of the user interface 20 and allows the user to submit a search query 32 to the knowledge server 12. The search query 32 may be keyword based, semantic or any other suitable form. The search query 32 is transmitted to the knowledge server 12, where it is processed.

In response to the search query 32, the knowledge server 12 produces a result list 34. In particular, a result identifying module of the knowledge server 12 is configured to identify knowledge elements 22 that are contained in the database 18 and which correspond to the search query 32. For example, result identifying module may identify a particular knowledge element 22 for inclusion in the result list 34 based on inclusion of one or more terms from the search query 32 in the technical data 28 or other portion of the knowledge element 22.

Upon receipt of the result list 34, the user can request that the knowledge server 12 identify persons (experts) having expertise in the subject matter described by the search query 32. Alternatively, experts could be identified contemporaneously with generation of the result list 34 or directly in response to a search query 32, wherein the result list 34 itself is not presented to the user. In response, the knowledge server 12 produces an expert list 36 corresponding directly to the result list 34, as will be described in detail.

In order to produce the expert list 36, the knowledge server 12 includes an expert identifying module and an expert ranking module. The expert identifying module is configured to identify experts associated with the search query 32 based on the authorship data 26 and, optionally, the modification data 27 associated with each knowledge element 22 that is included in the result list 34. The expert identifying module is configured to process each knowledge element 22 that is identified in the result list 34 and identify all persons that authored knowledge elements 22 as experts. The expert identifying module could additionally be configured to identify all of the persons that made modifications to the knowledge elements 22 that are included in the result list 34 as experts.

In order to discern which experts in the expert list 36 have the highest level of expertise in the subject matter described by the search query 32, the expert ranking module of the knowledge server 12 is configured to rank each expert identified by the expert identifying module on an expert-by-expert basis. The experts are ranked based on criteria associated with the knowledge elements 22 contained in the result list 34.

For each expert identified by the expert identifying module, the expert ranking module processes each knowledge element 22 that is included in the result list 34 and with which the expert is associated, and calculates a component score corresponding to each knowledge element 22. The component scores are summed to compute an expert score.

The component score (S) for each knowledge element 22 could be a fixed value that is equal for all knowledge elements 22, such that the expert score is computed as a function of the number of times that an expert has authored and, optionally, modified knowledge elements 22 or used knowledge elements 22. Preferably, however, the component scores are weighted according to the quality data 30, and authorship of the knowledge element 22 is weighted differently than modification of the knowledge element 22 or usage of the knowledge element 22. Thus, the component score S could be described by the following Equation 1, which is a function of a quality score Q, modifications M made to the knowledge element 22 by the expert, usages U of the knowledge element 22 by the expert, and authorship A of the knowledge element 22 by the expert, as well as weighting factors Wq, Wm, Wu, and Wa corresponding to quality, modification, usage and authorship, respectively, and also in light of a time factor T, which could be applied to any or all of the events described by the foregoing variables, such that the component score S only considers events within a temporal widow of significance, or places less weight on older events.

$$S=f(Q,M,U,A,Wq,Wm,Wu,Wa,T) \quad \text{(EQUATION 1)}$$

By way of a non-limiting example, the function described by Equation 1 could be evaluated according to the following Equations 2-4. First, an authorship score (Sa) attributable to an expert who authored a particular knowledge element 22 could be calculated according to the following Equation 2, wherein Q represents a quality score for the knowledge element 22, which is described by the quality data 30, and Wa represents a predetermined authorship weighting factor:

$$Sa=Q*Wa \quad \text{(EQUATION 2)}$$

Similarly, a modifying user score (Sm) attributable to an expert who modified a particular knowledge element 22 could be calculated according to the following Equation 3, wherein Q represents the quality score for the knowledge element 22, M represents the number of times the expert modified the knowledge element 22 during a specified time period, and Wm represents a predetermined modification weighting factor:

$$Sm=Q*M*Wm \quad \text{(EQUATION 3)}$$

Thus, the component score for an expert who authored but did not modify the knowledge element 22 would be equal to Sa, the component score for an expert who modified but did not author a knowledge element 22 would be equal to Sm, and the component score for an expert who both authored and modified a knowledge element 22 would be equal to the sum of Sa and Sm.

In addition to the authorship score Sa and the modifying user score Sm, the component score for each knowledge element 22 may also be based on part on a usage score (Su). The usage score Su attributable to an expert who used or viewed a particular knowledge element 22 could be calculated according to the following Equation 4, wherein Q represents the quality score for the knowledge element 22, U represents the number of times the expert used or viewed the knowledge element 22 during a specified time period, and Wu represents a predetermined usage waiting factor:

$$Su=Q*U*Wu \quad \text{(EQUATION 4)}$$

The component score (S) may then be computed by adding the usage score Su to one or both of the authorship score Sa and the modification score Sm, as applicable. Alternatively, Equations 2-4 may be combined into the following Equation 5, where Wa is equal to zero if the expert in question did not author the knowledge element 22:

$$S=Q*(Wa+M*Wm+U*Wu) \quad \text{(EQUATION 5)}$$

Once the component score S for each knowledge element 22 with which the author is associated has been calculated, the component scores are summed to determine the expert score for that particular expert. Of course, the calculations shown above are only examples, and the expert score could be calculated in various manners. The ranking process continues by processing the remaining experts that were identified by the expert identifying module.

After ranking the experts that are contained in the expert list 36, a ranked expert list 36 may be presented to the user by way of the user interface 20 of the user workstation 14. The ranked expert list 36 may contain the names and ranking scores of the experts, and may be sorted by rank. Of course, the ranking scores may be omitted, and the experts may simply be in a rank-sorted list, without displaying the ranking score.

Figure 3:
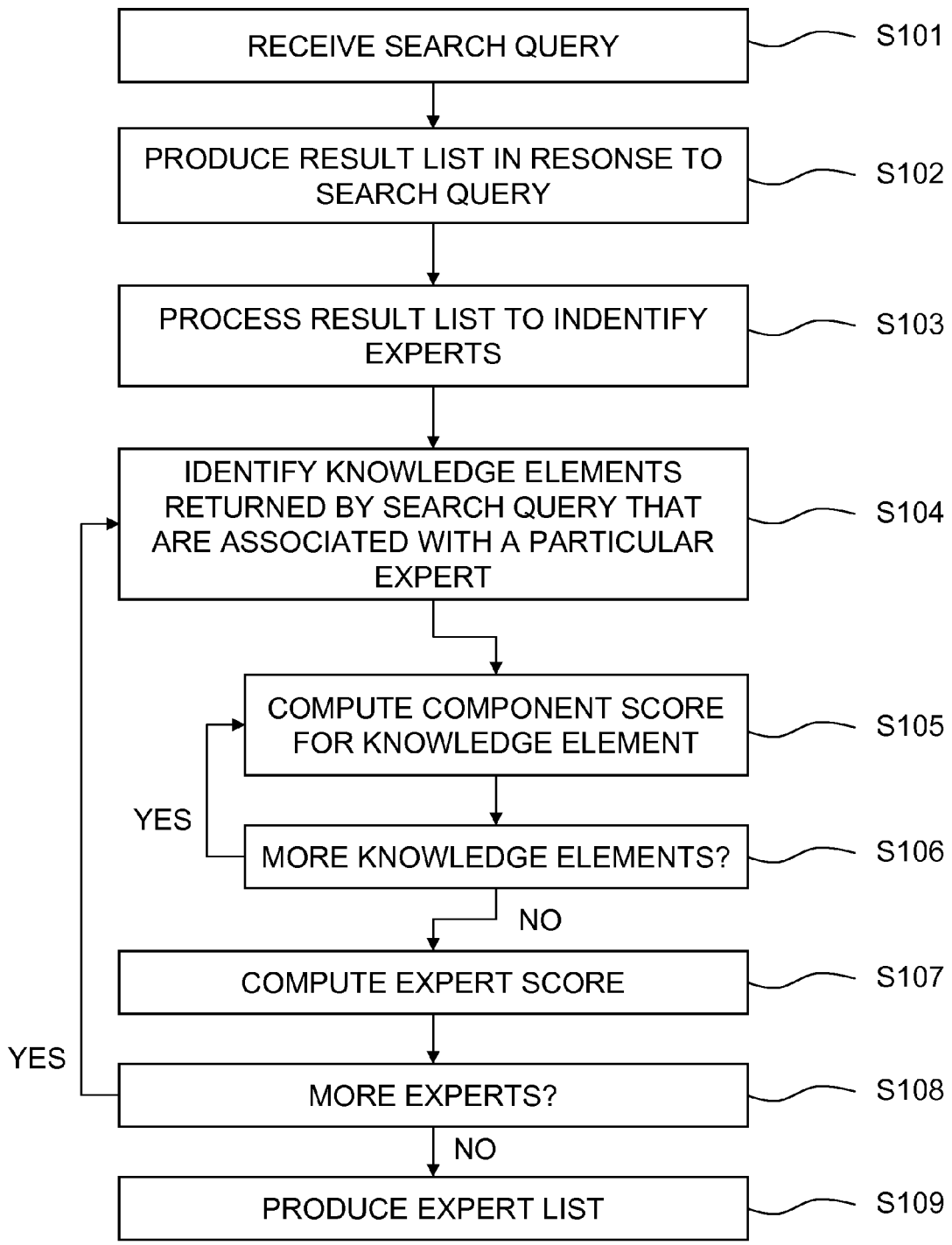
FIG. 3 is a flow chart showing the steps of an expert ranking method employed by the knowledge management system according to the invention.

Expert identification according to the invention will be better understood with reference to an exemplar ranking method, which will now be explained with reference to FIG. 3. In step S101 the search query 32 is received by the knowledge server 12 from the user workstation 14. In step S102 the knowledge server 12 searches the database 18 to identify knowledge elements 22 that correspond to the search query 32 and those knowledge elements are identified in the result list 34, which may be transmitted to the user workstation 14.

In step S103, the result list 34 is processed, either by the knowledge server 12 or the user workstation 14, to identify authors and, optionally, modifying users, as experts, based on the authorship data 26 and the modification data 27 contained in each knowledge element 22 that is included in the result list 34. In step S104, a particular expert is selected for calculation of the expert score, and the knowledge elements 22 that are included in the result list 34 and associated with that expert are identified. For a particular knowledge element 22 that was identified in step S104, the component score is calculated in step S105. In step S106, it is determined whether component scores need to be calculated for additional knowledge elements 22, and if so, step S105 is repeated for another one of the knowledge elements 22. After all of the component scores have been calculated, the expert score is calculated in step S107. In step S108, it is determined whether expert scores need to be calculated for additional experts that were identified in step S103, and if so, the process proceeds to step S104. After all of the expert scores have been computed, the expert list is produced in step S109 and may be transmitted to the user workstation 14 for display on the user interface 20.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is permitted under the law.

What is claimed is:

1. A method for ranking experts in a knowledge management system, comprising:
   storing a plurality of data elements in a database, the data elements having substantive technical data and bibliographic information encoded therein;
   receiving a query from a user system producing a result set from the database in response to the query, the result set including data elements having technical data encoded therein that corresponds to the query;
   producing an expert list based on the bibliographic information for the data elements contained in the result set; and
   ranking each expert in the expert list based on criteria associated with the result set to produce a ranked expert list.

2. The method of claim 1, further comprising:
   transmitting the ranked expert list to the user system.

3. The method of claim 1, wherein the step of ranking each expert in the expert list includes computing an expert score for each expert based on the bibliographic information for the data elements contained in the result set.

4. The method of claim 3, further comprising:
   the bibliographic data including authorship information, wherein each expert score is computed based on component scores corresponding to each data element in the result set, and each component score is computed based at least in part on the authorship information for the data element.

5. The method of claim 3, further comprising:
   the bibliographic data including modification information, wherein each expert score is computed based on component scores corresponding to each data element in the result set, and each component score is computed based at least in part on the modification information for the data element.

6. The method of claim 3, further comprising:
   the bibliographic data including usage information, wherein each expert score is computed based on component scores corresponding to each data element in the result set, and each component score is computed based at least in part on the usage information for the data element.

7. The knowledge management system of claim 3, wherein the bibliographic information for each data element includes at least one of identification of the expert that authored the data element, identification of each expert that modified the data element, or identification of each expert that used the data element.

8. The method of claim 3, wherein the expert score for each expert is computed based on at least one of a number of authorship events associated with the expert for the data elements contained in the result set, a number of modification events associated with the expert for the data elements contained in the result set, or a number of usage events associated with the expert for the data elements contained in the result set.

9. The method of claim 3, further comprising:
   associating a quality score with each data element of the plurality of data elements, wherein each expert score is computed based on component scores corresponding to each data element in the result set, and each component score is weighted according to the quality score of the data element.

10. The method of claim 3, wherein each expert score is computed based on component scores corresponding to each data element in the result set, wherein each component score is computed based on a subset of the bibliographic information that falls within a temporal window of significance.

11. A method for ranking experts in a knowledge management system, comprising:
    storing a plurality of data elements in a database, the data elements having substantive technical data and bibliographic information encoded therein, the bibliographic information including at least one of authorship information, modification information or usage information;
    receiving a query from a user system producing a result set from the database in response to the query, the result set including data elements having technical data encoded therein that corresponds to the query;
    producing an expert list based on one or more of the authorship information, modification information, or usage information for the data elements contained in the result set; and
    ranking each expert in the expert list based on criteria associated with the result set to produce a ranked expert list.

12. The method of claim 11, further comprising:
    transmitting the ranked expert list to the user system.

13. The method of claim 11, wherein the step of ranking each expert in the expert list includes computing an expert score for each expert based on the bibliographic information for the data elements contained in the result set.

14. The method of claim 13, wherein the authorship information includes identification of the expert that authored the data element, the modification information includes identification of each expert that modified the data element, and the usage information includes identification of each expert that used the data element.

15. The method of claim 14, wherein each an expert score is computed as a weighted average of at least the authorship information, the modification information and the usage information, according to a predetermined weighting.

16. The method of claim 13, wherein the expert score for each expert is computed based on at least one of a number of authorship events associated with the expert for the data elements contained in the result set, a number of modification events associated with the expert for the data elements contained in the result set, or a number of usage events associated with the expert for the data elements contained in the result set.

17. The method of claim 13, further comprising:
associating a quality score with each data element of the plurality of data elements, wherein each expert score is computed based on component scores corresponding to each data element in the result set, and each component score is weighted according to the quality score of the data element.

18. The method of claim 13, wherein each expert score is computed based on component scores corresponding to each data element in the result set, wherein each component score is computed based on a subset of the bibliographic information that falls within a temporal window of significance.

19. A method for ranking experts in a knowledge management system, comprising:
storing a plurality of data elements in a database, the data elements having substantive technical data and bibliographic information encoded therein, the bibliographic information including authorship information, modification information and usage information, wherein the authorship information includes identification of the expert that authored the data element, the modification information includes identification of each expert that modified the data element, and the usage information includes identification of each expert that used the data element;
receiving a query from a user system producing a result set from the database in response to the query, the result set consisting of data elements having technical data encoded therein that corresponds to the query;
producing an expert list based on one or more of the authorship information, modification information or usage information for the data elements contained in the result set;
computing an expert score for each expert based on the bibliographic information for the data elements contained in the result set;
ranking each expert in the expert list according to the expert scores to produce a ranked expert list; and
transmitting the ranked expert list to the user system.

20. The method of claim 19, further comprising:
associating a quality score with each data element of the plurality of data elements, wherein each expert score is computed based on component scores corresponding to each data element in the result set, and each component score is weighted according to the quality score of the data element.

* * * * *